March 26, 1957 F. KESSLER 2,786,890

COIN CONTROL CIRCUIT FOR TELEPHONE SYSTEMS

Filed July 17, 1953 2 Sheets-Sheet 1

INVENTOR.
FRANK KESSLER
BY T. L. Bowes
ATTORNEY

INVENTOR.
FRANK KESSLER

BY T. L. Bowes

ATTORNEY 2,786,890

COIN CONTROL CIRCUIT FOR TELEPHONE SYSTEMS

Frank Kessler, Los Angeles, Calif., assignor, by mesne assignments, to General Dynamics Corporation, a corporation of Delaware Application July 17, 1953, Serial No. 368,774

7 Claims. (Cl. 179—6.3)

This invention relates to telephone systems, and more particularly to means for the control of the coin functions in paystation telephones.

In a dial telephone system, means are necessary for the directive selection of the particular paystation telephone by an operator, and it is also essential that the coin control procedure be easily performed thereafter by the operator, as required. This coin control function has previously been performed by the controlled operation of apparatus individual to the paystation line.

It is the object of this invention to provide for the coin control function by means which is universally applicable to any paystation line in a group without the necessity for special apparatus in each individual line equipment.

Figure 1:
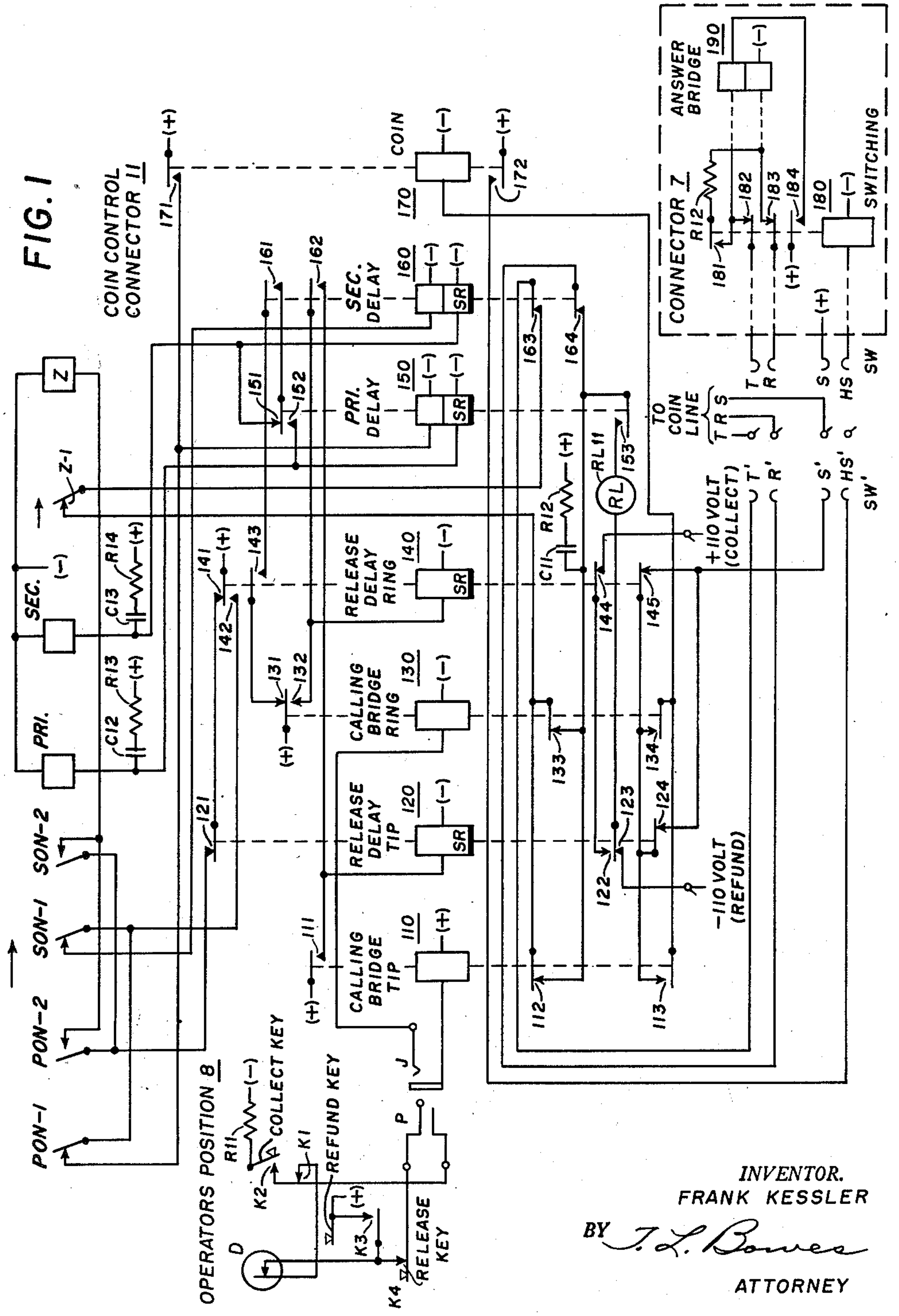
Figure 2:
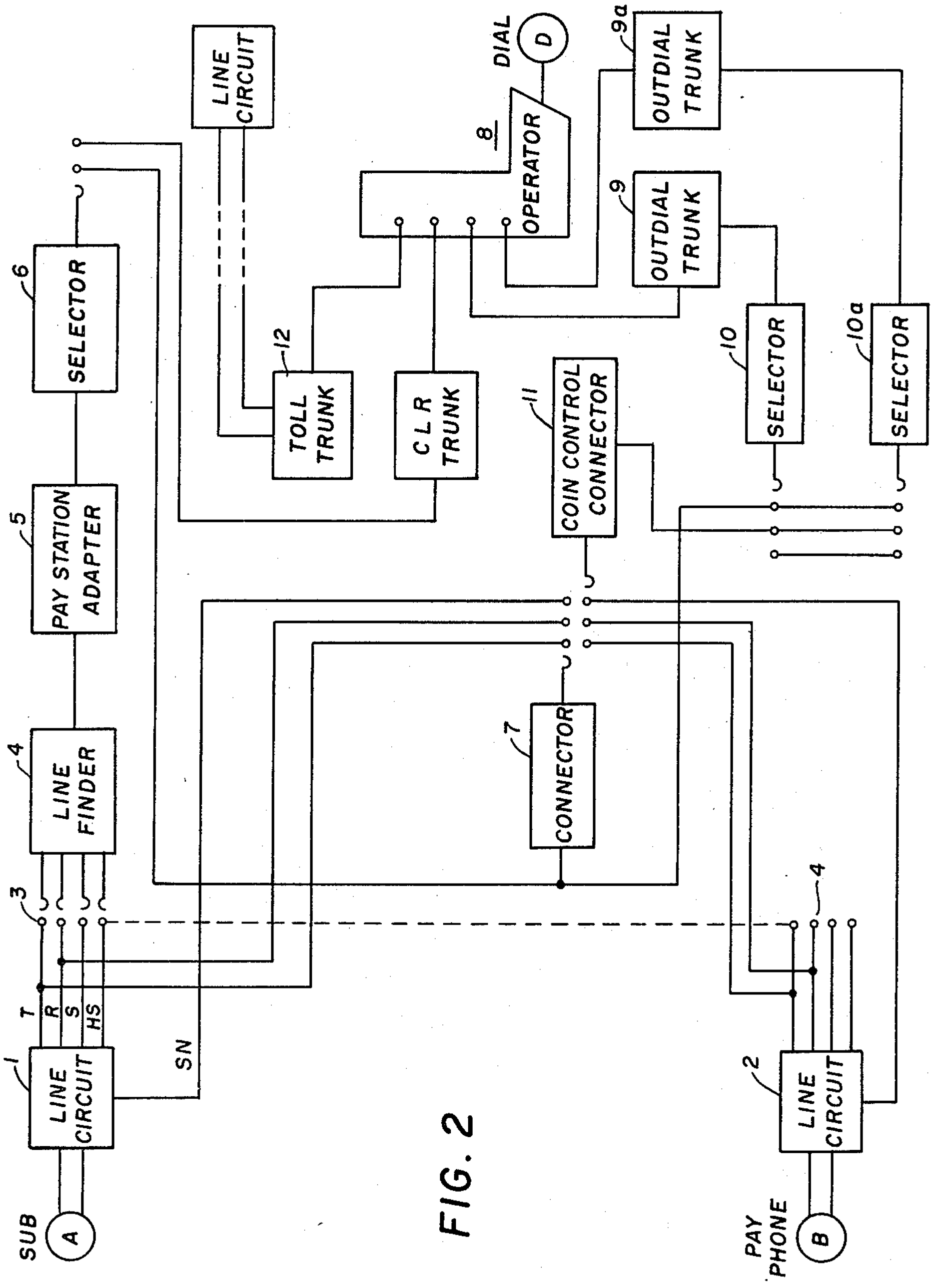

The features which I believe to be novel are set forth in the appended claims. My invention itself, both as to its organization and manner of operation, together with further objects and advantages thereof, may best be understood by reference to the following description taken in connection with the accompanying drawing in which Fig. 1 shows the circuit details of a coin control circuit or connector necessary to accomplish the purposes of my invention, and Fig. 2 shows in block form a system embodying the circuit of Fig. 1. Except for the details illustrated in Fig. 1, the circuits are conventional and are not illustrated in detail for purposes of simplicity.

There are illustrated in Fig. 2 the essential portions of a dial telephone office to illustrate the principles of my invention. For instance, the subscriber at sub A may originate a call through its individual line circuit 1 which is then seized, in the usual manner, by a line finder 4 which operates to cause its brushes to connect with bank terminals 3 of line circuit 1. The line finder 4 is then, in turn, associated with selector 6 through paystation adapter 5, in a well known manner. Subscriber A may now cause the selector 6 to connect with connector 7, as by means of a dial operation in the well known manner. The connector 7 may then be directed by dial pulses from sub A to connect with line circuit 2 and pay telephone B. A call may also be originated by pay telephone B, through line circuit 2 and bank terminals 4, to any other telephone in the system in the well known manner.

The operator at position 8 may wish to connect with pay telephone B, as on a toll call from or to a calling subscriber, for example incoming over toll trunk 12. The operator may connect with an out dial trunk 9, in a conventional manner, to operate a selector 10 which is then in turn directively operated to select an idle connector 7. This connector 7 is then directively stepped to connect with line circuit 2 and pay telephone B in a well known manner.

During any connection through operator's position 8, it may be desired to perform a coin control function. For example, the operator may wish to refund an over deposit of coins at paystation B, or the hopper at paystation B may be full and collection may be necessary to enable the deposit of further coins. Similarly, on a "collect" call to paystation B, the operator at position 8 may wish to control coins deposited at pay telephone B in some desired manner. She therefore may connect with another out dial trunk 9*a* and directively step a selector 10*a* so that it connects with an idle coin control circuit or connector 11 which is then, in turn, directively stepped so that its brushes engage the particular bank contacts on which the original call to pay telephone B is already connected.

Referring to Fig. 1 for a detailed description of the coin control operations, when the operator inserts plug P into jack J at position 8, calling bridge tip relay 110 and calling bridge ring relay 130 are energized in series from ground, shown as (+), through the winding of relay 110, jack J, plug P, normally closed collect key contacts K–1, pulsing contacts of dial D, release key contacts K–4, plug P, jack J, and the winding of relay 130 to battery, shown as (—).

Operation of relay 110 energizes release delay tip relay 120 from ground through operated contacts 111 and the winding of relay 120 to battery. In response to the operation of erlay 130, release delay ring relay 140 is operated from ground through operated contacts 132 and the winding of relay 140 to battery. Both relays 120 and 140 have slow release characteristics so that they remain operated during the subsequent pulsing action of relays 110 and 130 during dialing by the operator.

Operation of relay 140 and relay 120 opens ground at normally closed contacts 141 and 121, respectively, so that when the switch SW moves from its normal position to close primary off-normal contacts PON-2 during primary movement of the switch and subsequently secondary off-normal contacts SON–2 during the secondary movement of the switch, the release magnet Z will not be operated to restore the switching mechanism. The operation of relay 140 also energizes primary-delay relay 150 from ground through operated contacts 142, normally closed contacts PON–1, and the upper winding of relay 150 to battery; and energizes the secondary-delay relay 160 from ground through operated contacts 142, normally closed contacts SON–1, and the upper winding of relay 160 to battery. Both relay 150 and relay 160 have slow release characteristics so that each remains operated while their respective pulsing cycles are being completed.

Operation of relay 160 closes a pulsing circuit for the primary stepping magnet PRI at operated contacts 161. When the operator determines that it is necessary to either collect or refund the previously deposited coins, the coin control switch SW' is stepped to the paystation line terminal by operation of dial D at the operator's position in the regular manner. When relay 130 intermittently releases during the dialing procedure for the first digit, the magnet PRI is correspondingly energized from ground through momentarily and periodically closed contacts 131, operated contacts 143, 161 and 152, and the magnet PRI winding to battery. The last described circuit also completes a second circuit for relay 150 through the lower winding of relay 150 to battery. As the switch mechanism SW' moves off normal on the first step in the primary direction, the upper holding winding of relay 150 is opened at now-open contacts PON–1 but relay 150 is held operated through its lower winding until pulsing in the primary direction ceases and relay 130 remains operated to hold open contacts 131. Relay 150 restores at the end of the dialed digit.

As relay 130 restores intermittently in response to the pulses of the second digit, the magnet SEC is correspondingly energized from ground through momentarily closed contacts 131, operated contacts 143 and 161, normally closed contacts 151, and the magnet SEC to battery. A holding circuit for relay 160 is also completed through this stepping circuit and the lower winding of relay 160 to battery. As the switch mechanism moves off normal on the first step in the secondary direction, the upper holding winding of relay 160 is opened at contacts SON–1 but relay 160 is held operated through its lower winding, until the pulsing in the secondary direction ceases.

It is assumed that the coin control circuit or connector 11 has been caused to step to the same bank position as the regular connector 7 during the extension of the call to the called line so that the tip, ring, sleeve, and auxiliary brushes T, R, S, and HS, respectively, of the regular connector switch SW and the brushes T', R', S', and HS' of coin control connector SW' are now connected together through the bank multiple wiring as indicated generally in Fig. 1. Ground through the sleeve brush S of the regular connector switch SW is now connected through the bank multiple wiring to the sleeve brush S' of the coin control connector SW' by way of the bank wiring, normally closed contacts 124, operated contacts 134, and the winding of coin relay 170 to battery.

Operation of relay 170 at this time re-energizes primary-delay relay 150 through operated contacts 171 and the upper winding of relay 150 to close contacts 153 for subsequent coin control purposes, and energizes switching relay 180 through operated contacts 172, auxiliary brush HS', the bank multiple, and auxiliary brush HS.

Operation of relay 180 connects a resistor R12 through preliminarily operated contacts 181, across conductors T and R to hold the answer bridge relay 190 in an operated condition, and opens the outgoing tip and ring conductors T and R, respectively, at contacts 182 and 183, respectively, so that the coin battery subsequently connected to the paystation line will not be shunted by the apparatus normally connected to the line. The coins in the paystation instrument may now be refunded or collected, as required.

To refund the coins at the paystation telephone, the refund key is operated to connect ground through contacts K–3 to the loop holding relays 110 and 130 operated. Relay 130 remains operated but relay 110 restores because ground is now connected on each side of its winding. The restoration of relay 110 effects the deenergization of relay 120 at now open contacts 111. After a time interval relay 120 restores to connect the —110 volt refund potential through normal contacts 123, resistance lamp RL–11, operated contacts 153, normally closed contacts 164, and ring brush R' to the associated bank terminal of the coin line. The —110 volt refund potential is also connected through normal contacts 123, lamp RL–11, operated contacts 153, normally closed contacts 112, Z–1, and 163, to tip brush T' and the associated bank terminal of the coin line.

Restoration of the refund key causes relays 110 and 120 to reoperate to disconnect the —110 volt refund potential and to otherwise restore the coin control circuit to its original condition.

To collect the coins at the paystation telephone, the collect key is operated to open the loop holding circuit to relays 110 and 130 at contacts K–1 and to connect battery, through resistor R11 and contacts K–2, to relay 110 to hold it operated. Thus, relay 130 releases, but relay 110 is held operated. In response to the restoration of relay 130, relay 140 is deenergized at contacts 132 and releases after a time interval. Restoration of relay 140 connects the +110 volt collect potential through normally closed contacts 144, operated contacts 122, resistance lamp RL–11, operated contacts 153, and normally closed contacts 164 to the brush R' and the associated bank terminal of the coin line. The +110 volt collect potential is also now connected through operated contacts 153, normally closed contacts 133, Z–1 and 163, to the brush T' and the associated bank terminal of the coin line.

Restoration of the collect key causes relays 130 and 140 to reoperate to disconnect the +110 volt collect potential and to otherwise restore the coin control circuit to its original condition.

At the completion of the coin control function, the coin control switch SW' is restored to its original position by the operation of the release key, to open the loop circuit to relays 110 and 130 at contacts K–4. Relays 120 and relay 140 also restore, after a time interval, because of opening of contacts 111 and 132, respectively, to close ground, through normal contacts 141, 121 and through operated contacts PON–2 and/or SON–2, to operate the release magnet Z to restore the control switch SW' to its normal position. The loop circuit across the brushes T' and R' is opened at contacts Z–1 while the release magnet Z is operated to prevent interference on other talking connections while the coin control switch is restoring. The relay 180 is also restored so that the paystation line is reconnected to the calling party for resumption of conversation.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, a plurality of lines, each line having at least one station, one of said stations being a paystation; an operator's position; a connector having a plurality of sets of multipled bank contacts and a set of brushes for engagement with predetermined ones of said contacts corresponding to a called line; means at said operator's position for utilizing said connector to cause said connector brushes to engage that set of contacts corresponding to the called paystation line in order to complete a talking connection between said paystation and another of said lines; a coin control circuit, said coin control circuit having a calling bridge tip relay and a calling bridge ring relay, a source of two control potentials of different characteristics, means responsive to seizure of said coin control circuit for operating said calling bridge relays, said circuit also having a set of brushes for engagement with said bank contacts; and means at said operator's position for utilizing said calling bridge relays for causing said circuit brushes also to engage said multipled contacts which correspond to said called paystation line; means controlled at said operator's position for selectively releasing either said calling bridge tip relay or said calling bridge ring relay; means responsive to the release of said calling bridge tip relay for applying one of said coin control potentials to said paystation line; and means responsive to the release of said calling bridge ring relay for applying the other one of said coin control potentials to said paystation line.

2. In a telephone system a plurality of lines, there being at least one station associated with each one of said lines, one of said stations being a paystation; an operator's position; a connector having a plurality of sets of multipled bank contacts divided into tip, ring, sleeve, and auxiliary bank multiples and a set of brushes comprising tip, ring, sleeve, and auxiliary brushes, corresponding to the respective sets of bank multiples; said connector also having an answer bridge relay and a switching relay; means including said connector and said operator's position for extending a call between said lines; means responsive to the answering of the extended call for operating said answer bridge relay in said connector; a coin control circuit including a set of brushes comprising tip, ring, sleeve, and auxiliary brushes, and means for causing said circuit brushes to advance into the respective bank multiples; means controlled by an operator at said operator's position for causing said coin control circuit brushes to engage contacts in said bank multiples corresponding to said paystation line; a source of coin control potential, means controlled by said operator for applying said potential to said paystation line through the said tip or said ring brushes of said circuit for coin control purposes; means responsive to said engagement of contacts and utilizing both of said auxiliary brushes and the associated bank multiple for operating said switching relay; and means responsive to the operation of said switching relay for disconnecting said connector from the extended connection while establishing a circuit for holding operated said answer bridge relay whereby shunting of the extended connection during application of said coin control potential is prevented without releasing said connection.

3. In a telephone system first and second lines, there being at least one station associated with each one of said lines and one of said stations being a paystation; an operator's position; a connector having a plurality of sets of multipled bank contacts; means including said connector and said operator's position for extending a call between said paystation line and another of said lines; a coin control circuit including a set of brushes and means for causing said circuit brushes to advance into the respective bank multiples; said coin control circuit having a delay relay, and a source of coin control potential; means controlled by an operator at said operator's position for causing said coin control circuit brushes to engage contacts in said bank multiples corresponding to said paystation line; means responsive to the selection of said engaged contacts for operating said delay relay in said coin control circuit; means responsive to the operation of said delay relay for preparing a circuit for connecting said source of coin control potential to said paystation line.

4. In a telephone system first and second lines, there being at least one station associated with each one of said lines and one of said stations being a paystation, an operator's position, a connector having a plurality of sets of multipled bank contacts divided into tip, ring, sleeve, and auxiliary bank multiples, and having a set of brushes comprising tip, ring, sleeve, and auxiliary brushes corresponding to the respective sets of bank multiples; means including said connector and said operator's position for extending a call between said paystation line and another of said lines; a coin control circuit including tip, ring, sleeve, and auxiliary brushes and means for causing said circuit brushes to advance into the respective bank multiples; said coin control circuit having a coin relay, a delay relay, and a source of coin control potential; means controlled by an operator at said operator's position for causing said coin control circuit brushes to engage contacts in said bank multiples corresponding to said paystation line; means utilizing both of said sleeve brushes and responsive to the selection of said engaged contacts for operating said coin relay; means responsive to the operation of said coin relay for operating said delay relay in said coin control circuit; means responsive to the operation of said delay relay for preparing a circuit for connecting said source of coin control potential to said paystation line.

5. In a telephone system first and second lines, there being at least one station associated with each one of said lines and one of said stations being a paystation; an operator's position; a connector having a plurality of sets of multipled bank contacts divided into tip, ring, sleeve, and auxiliary bank multiples and having a set of brushes comprising tip, ring, sleeve, and auxiliary brushes corresponding to the respective sets of bank multiples; said connector also having an answer bridge relay and a switching relay; means including said connector and said operator's position for extending a call between said paystation line and another of said lines, means responsive to the answering of the extended call for operating said answer bridge relay in said connector; a coin control circuit including tip, ring, sleeve, and auxiliary brushes and means for causing said circuit brushes to advance into the respective bank multiples; said coin control circuit having a coin relay, a delay relay, and a source of coin control potential; means controlled by an operator at said operator's position for causing said coin control circuit brushes to engage contacts in said bank multiples corresponding to said paystation line, means also responsive to said contact engagement for operating said coin relay; means responsive to the operation of said coin relay for operating said delay relay for preparing a circuit for connecting said source of coin control potential to said paystation line; means also responsive to the operation of said coin relay and utilizing the auxiliary brush of said connector and the auxiliary brush of said switch for operating said switching relay; and means responsive to the operation of said switching relay for disconnecting said connector from the extended connection while establishing a circuit for holding operated said answer bridge relay whereby shunting of the extended connection during application of coin control potential is prevented without releasing the extended connection.

6. In a telephone system first and second lines, there being at least one station associated with each one of said lines, one of said stations being a paystation; an operator's position; a connector having a plurality of sets of multipled bank contacts divided into tip, ring, sleeve, and auxiliary bank multiples and having a set of brushes comprising tip, ring, sleeve, and auxiliary brushes corresponding to the respective sets of bank multiples, said connector also having an answer bridge relay and a switching relay; means including said connector and said operator's position for extending a call between said lines; means responsive to the answering of the extended call for operating said answer bridge relay in said connector; a coin control circuit including tip, ring, sleeve, and auxiliary brushes and means for causing said circuit brushes to advance into the respective bank multiples; means controlled by an operator at said operator's position for causing said coin control circuit brushes to engage contacts in said bank multiples corresponding to said paystation line; said coin control circuit also having a coin relay, a delay relay, a source of two coin control potentials of different characteristics, a calling bridge relay and a release delay relay; means responsive to seizure of said coin control circuit for operating said calling bridge and said release delay relays, means controlled by said operator for releasing said calling bridge relay; means responsive to the release of said calling bridge relay for releasing said release delay relay; and means responsive to the release of the last-mentioned relay for applying one of said coin control potentials to said paystation line for coin control purposes.

7. In a telephone system first and second lines, there being at least one station associated with each one of said lines, one of said stations being a paystation; an operator's position; a connector having a plurality of sets of multipled bank contacts divided into tip, ring, sleeve, and auxiliary bank multiples and having a set of brushes comprising tip, ring, sleeve, and auxiliary brushes corresponding to the respective sets of bank multiples, said connector also having an answer bridge relay and a switching relay; means including said connector and said operator's position for extending a call between said lines; means responsive to the answering of the extended call for operating said answer bridge relay in said connector; a coin control circuit including tip, ring, sleeve, and auxiliary brushes and means for causing said circuit brushes to advance into the respective bank multiples; means controlled by an operator at said operator's position for causing said coin control circuit brushes to engage contacts in said bank multiples corresponding to said paystation line; said coin control circuit also having a coin relay, a delay relay, a source of two coin control potentials of different characteristics, a calling bridge tip relay and a release delay tip relay, means responsive to seizure of said coin control circuit for operating said bridge tip and said release delay relays; means controlled by said operator for releasing said calling bridge tip relay; means responsive to the release of said calling bridge tip relay for releasing said release delay tip relay; means responsive to the release of the last-mentioned relay for applying one of said coin control potentials to said paystation line for coin refund purposes; said coin control circuit also including a calling bridge ring relay and a release delay ring relay; means controlled by said operator for releasing said calling bridge ring relay and said release delay ring relay, and means responsive to the release of the last-mentioned relays for applying the other of said potentials to said paystation line for coin collect purposes.

References Cited in the file of this patent

UNITED STATES PATENTS

| | | |
|---|---|---|
| 2,374,964 | Walsh | May 1, 1945 |
| 2,385,720 | Molnar | Sept. 25, 1945 |
| 2,558,571 | Lamberty | June 26, 1951 |
| 2,644,040 | Lomax | June 30, 1953 |
| 2,655,558 | Kessler | Oct. 13, 1953 |
| 2,657,267 | Pharis | Oct. 27, 1953 |